United States Patent [19]

Van Gaalen

[11] 4,369,735
[45] Jan. 25, 1983

[54] MOVING DAM WATERWAY CLEANER

[76] Inventor: Neil Van Gaalen, P.O. Box 578, Glenwood Springs, Colo. 81601

[21] Appl. No.: 256,013

[22] Filed: Apr. 21, 1981

[51] Int. Cl.³ .............................................. A01K 63/00
[52] U.S. Cl. ...................................................... 119/3
[58] Field of Search .............................. 119/3, 2, 4, 5; 15/104.06 R

[56] References Cited

U.S. PATENT DOCUMENTS

| 2,198,823 | 4/1940 | Kelpsh | 15/104.06 R |
| 2,289,109 | 7/1942 | Edwards et al. | 15/104.06 R |
| 4,236,488 | 12/1980 | Olds et al. | 119/5 |

FOREIGN PATENT DOCUMENTS 867284  5/1961  United Kingdom ................. 119/22

Primary Examiner—Hugh R. Chamblee
Attorney, Agent, or Firm—Kyle W. Rost

[57] ABSTRACT

Fish breeding raceways and other water channels of uniform cross-section are cleaned by a moving dam having a water passageway along the bottom to cause flushing of loose dirt as water accumulated behind the dam rushes through the passageway, and the water head behind the dam also provides force to move the dam longitudinally through the raceway. A support mechanism prevents the dam from tipping forward under the force of the water head, and this mechanism may be one or more arms extending forwardly of the dam and in contact with the raceway bottom wall. A bottom cleaning member such as a brush, sponge, or wiper is connected to the dam in advance of the water passageway, such as at the forward end of the support mechanism, for loosening removable material. Flexible seals at the sides and bottom of the dam limit excessive loss of water head due to irregularities in the channel cross-section, and the bottom seal may define a downwardly angled water passageway on the upstream side of the passageway under the dam for further improved flushing action.

11 Claims, 6 Drawing Figures

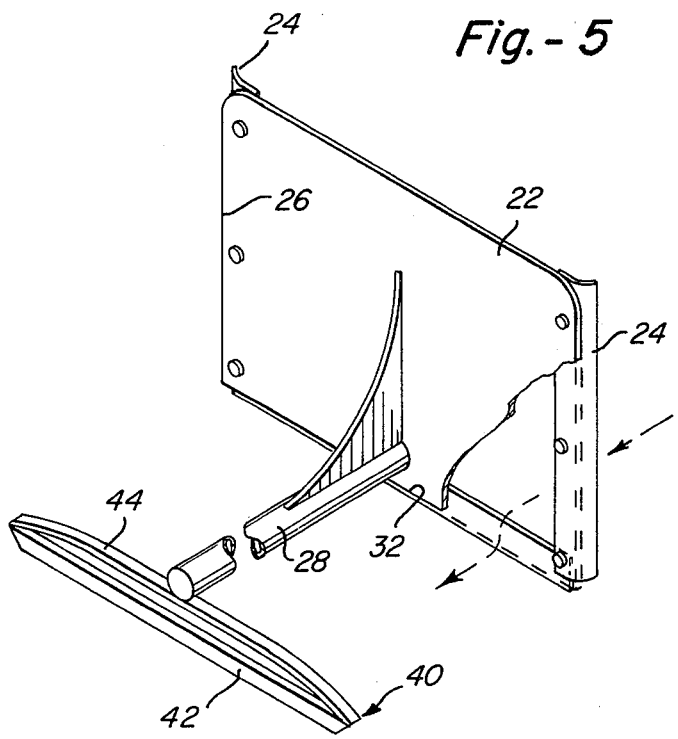
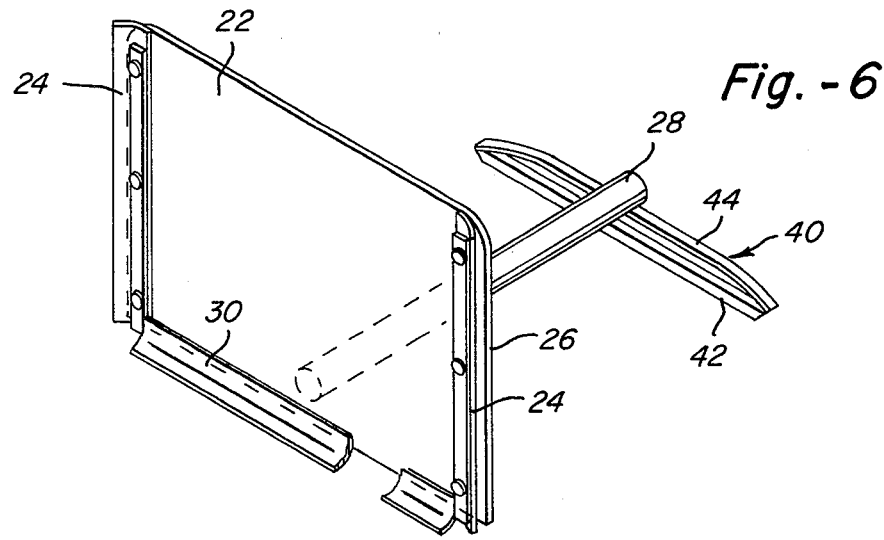

MOVING DAM WATERWAY CLEANER

BACKGROUND OF THE INVENTION

1. Field of the Invention

The invention relates to animal husbandry and specifically to fish culture. A cleaning apparatus for removing debris from fish breeding raceways and other water channels is disclosed.

2. Description of the Priot Art

Fish breeding raceways are lined channels having a directional flow of water, often supplied from a natural source such as a stream. The fish are maintained in the channel between screens at the opposite channel ends, permitting the current to flow through the screens and raceway. Organic debris naturally accumulates in the raceway and must be cleaned periodically. A common cleaning method is to use a brush to sweep the debris from the upstream end of the raceway to the downstream end, where some debris will be washed through the downstream screen by the current and the remaining debris can be removed by other means such as by temporarily removing the downstream screen or by drawing the debris out of the raceway by suction.

Improved sweepers have been proposed as taught in U.S. Pat. No. 4,221,187 to Casey, wherein a sweeper head having constantly applied suction is driven along a tank bottom by a motor powered cable. This type of cleaning system is installed in each tank in a permanent manner and represents a considerable quantity of peripheral equipment required in addition to the sweeper head.

A further cleaning technique is taught in U.S. Pat. No. 4,093,546 to Taborsky, wherein flowing stream water passes through a biological filter, at the end of which is a gate. Water flowing over the gate tends to drop carried debris in front of the gate. Thereafter, the gate is raised to allow the water to wash away the accumulated sediment. The benefit of this system is limited to a channel structured in such a way that substantially all sediment will be carried as far as the gate so that the desired washing can occur.

The present invention overcomes the limitations of the above noted devices while providing an automated cleaning device for elongated water channels.

SUMMARY OF THE INVENTION

A cleaning device for fish breeding raceways and other elongated water channels having a bottom wall and a pair of opposite side walls provides a dam means that is capable of retaining a head of water on its upstream side in the channel. The dam means is maintained from tipping under the retained water head by a suitable support means that permits the dam means to move longitudinally with respect to the elongated channel. A water passageway is defined substantially along the bottom edge of the dam means whereby water under pressure of the retained head flows under the dam means through the passageway and flushes debris ahead of the dam means.

The dam means may include lateral seals such as a flexible flap on each side edge, preventing excessive loss of water other than under the dam means and accommodating irregularities in the contour of the channel side walls. Further, the dam means may be connected to a bottom edge seal means, which may be a flexible flap, preventing excessive loss of water under the dam means due to irregularities in the channel bottom wall. Such a bottom seal may be offset to the rear, upstream face of the dam means so as to form a vertical water passageway between the seal and the dam face and thereby direct the water first downwardly against the channel bottom before permitting the water to flow under the dam means. Additionally, the seal may function as a bottom spacer that holds the bottom edge of the dam means at a predetermined minimum distance from the channel bottom and thereby defines, in cooperation with the dam means, the water passageway under the dam means.

The support means may include an elongated member extending forwardly of the dam means and contacting a surface of the water channel in order to maintain the dam means against tipping forward under the pressure of the retained water head. The channel bottom may be the surface contacted by the support means, and a channel-bottom contacting member may also be associated with the cleaning device for disrupting loose or removable materials on the channel bottom in advance of the dam means. Such a channel bottom contacting member may be attached to the support means in order to take advantage of the pressure of the water head to maintain the channel bottom contacting member against the channel bottom. One suitable channel bottom contacting means includes a brush oriented transversely to the direction of dam means movement. Another channel bottom contacting means may be a wiper blade, best suited for use against smooth channel bottoms.

The main object of the invention is to provide a cleaning device for water channels, wherein the cleaning device operates without externally applied power other than as supplied by the water current flowing through the channel. The invention provides a moving dam that cleans a water channel as it moves the length of the channel under power of retained water behind the dam. The cleaning device is therefore self-contained and does not require fixed installation in any particular channel or raceway. Further, the cleaning device is portable, and a single such device is capable of being used in many channels of similar cross-sectional configuration.

An impotant object is to loosen debris from the channel bottom in advance of the moving dam so that the current of water passing under the dam can flush the debris downstream. The use of a brush or wiper in contact with the channel bottom provides the desired loosening, and such a bottom contacting member may gain improved cleaning ability when attached to the support means stabilizing the dam means against forward tipping.

Another object to to prevent loss of cleaning efficiency when the channel has irregularities in the channel bottom or walls. Flexible seals prevent excess loss of water head under such circumstances. The bottom seal serves this function while additionally enhancing the ability of the water stream passing under the dam means to flush loose debris.

BRIEF DESCRIPTION OF THE DRAWINGS

FIG. 5 is an isometric view of the cleaning device, showing the front side thereof.

FIG. 6 is an isometric view of the cleaning device, showing the rear side thereof.

DESCRIPTION OF THE PREFERRED EMBODIMENT

Figures 1, 2, 3, 4:
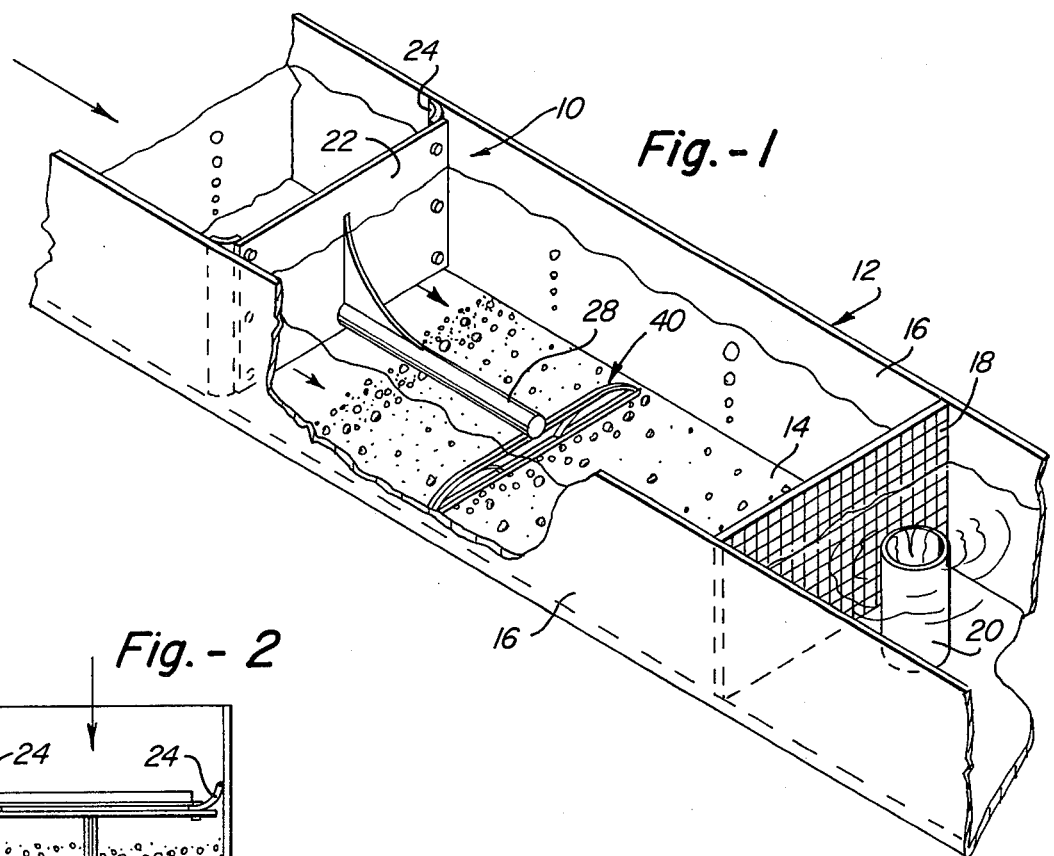
FIG. 1 is an isometric view showing a raceway having the cleaning device operating therein.
FIG. 2 is a top plan view of the raceway and cleaning device.
FIG. 3 is a vertical cross-section taken longitudinally through the raceway and cleaning device.
FIG. 4 is an enlarged fragmentary view of the cleaning device as shown in FIG. 3.

The invention is best shown in FIG. 1 as a cleaning device 10 for flushing loose or movable debris along a water channel 12, which may be any type of channel having a reasonably uniform transverse cross-section such that the cleaning device is able to maintain a head of water on its rear or upstream side. Suitable channels include fish breeding troughs, known as raceways, which receive a supply of incoming water from one end of the elongated channel, as shown by the arrow in FIG. 1, and discharge the water from the opposite end. A raceway may have a flat bottom wall 14 and a pair of opposite side walls 16, defining a channel of approximately rectangular cross-section; or the sides may be angled to define an approximately trapezoidal cross-section. Fish being raised in such a raceway are maintained between an upstream screen and a downstream screen 18. The water level in the raceway may be maintained by a standpipe 20 downstream of the screen 18. Raceways may be very smooth on their inside surfaces, such as when they are formed from a plastic or fiberglass, or they may be relatively rough, such as when they are formed from concrete. The cleaning device 10 may be used with other types of water channels as well, such as with irrigation ditches. These and other types of channels may accumulate debris or deposits or other removable types of materials that it is desired to remove periodically. Most commonly, the removable materials will gather at the bottom of the channel by gravity, whether the bottom is flat, curved, V shaped or otherwise configured, and regardless of whether the bottom wall is clearly distinguished from the side walls. Therefore, the term "bottom" as applied to the channel will refer generally to the surface or surface portion to which removable material is brought into contact by gravity.

The cleaning device 10 is a movable dam that gains its motive power to move in the direction of water flow along an elongated trough or channel by the force of water retained behind the dam. With general reference to all of the drawings, the cleaning device includes a dam means 22 for retaining a head of water on its upstream side, with respect to the position of the dam means in a channel. The dam means may be formed from sheet material such as plastic or metal and may be adapted to fit transversely across the channel with the perimeter of the dam means approximating the contour of the desired channel at the bottom and sides. If the channel contains a predetermined water level, the dam means should be configured to have its top edge above the water level so that a head of water can be accumulated behind the dam means, thereby raising the water above the predetermined level on the upstream side of the dam means. In order to permit the dam means to move along the elongated trough, the side edges of the dam means and of the trough have limited frictional contact so that, on one hand, the dam means is movable along the channel under the force of the retained water head, and, on the other hand, the water is limited from freely flowing between the dam means side edges and the channel side walls. In order to achieve both desired results, a lateral seal means 24 such as flexible flaps of rubber may be attached to each side edge 26 of the dam means, preferably from the rear face of the dam means. These flaps provide close contact with the channel sides while accommodating variations in the channel width.

The dam means is maintained in water head retaining position by a support means. As shown in the drawings, the dam means may be a substantially vertical plate of relatively thin material and is prevented from tipping forward by an elongated member 28 extending forward from the plate. This member may directly contact a surface of the channel, such as the bottom wall 14, or carry an intermediate object that contacts the channel surface. The support means may include enlargements of the dam wall itself, such as relatively thickened portions near the bottom of the dam means. The forwardly extending support means may be centrally located, as shown in the drawings, or extend from one or both side edges.

The movable dam performs its cleaning at least in part by a water flushing action. The dam is supported in such a manner that a water passageway is defined near its bottom edge, in close proximity to the bottom wall of the channel. A spacer 30 may retain the dam bottom edge 32 at a predetermined distance from the channel bottom wall, thereby defining the passageway 34 through which water from the retained water head flows with flushing action against the channel bottom wall. The spacer may be defined by intermittent depending members from the dam wall itself, by wheels or skids attached to the dam means, by a slot formed through the dam means itself near bottom edge 32, or by a separate member attached to the cleaning device either in approximate vertical alignment with the dam means or offset to the front or rear of the dam means. As best shown in FIGS. 4-6, the spacer 30 is preferred to be a transverse wall offset to the rear of the dam means and at least partially blocking horizontal access to slot 34. The slot may thereby be extended to have a vertical portion 36 immediately to the rear of the generally horizontal portion 34 shown in the drawing. Water flow from the rear face of the dam means is directed downwardly through vertical slot portion 36 before passing forwardly through horizontal slot portion 34, increasing the flushing action of the water stream against the channel bottom. Spacer 30 is attached to the cleaning device by suitable fasteners that maintain the desired distance between the spacer and the dam means. The spacer may include or be connected to a bottom seal means 38, which may be a flexible sheet of rubber or plastic that assures limited water flow under the spacer at irregularities in the channel bottom wall.

Because the support means 28 may bear considerable force from the water head retained behind the dam means 22, a channel bottom contacting member 40 may be attached to the support means in a position intermediate the support means and the channel bottom wall. Such a member 40 may be elongated and oriented transversely to the channel so as to contact a broad portion of the channel bottom and disrupt accumulated loose or loosenable matter that it is desired to remove by the subsequent water flow under the dam means. When the channel is relatively smooth, the contacting member may be a wiper, such as a rubber blade 42. One such suitable wiper blade is of the type used on windshields, having a backing arm 44 that maintains the blade in contact with the bottom surface of the channel despite small irregularities or angles in that surface. When the channel bottom is relatively rough, member 40 may be a brush having bristles 46 better capable of disrupting removable materials on the channel bottom. The brush, wiper, or other channel bottom contacting member need not be entirely straight but may be adapted to the contour of the channel in which the cleaning device is to be used.

Employing the specific example of a fish raceway, wastes from the bottom of the raceway are removed by placing the cleaning device 10 at the upstream end of the raceway with the dam means immediately inside the upstream screen. A water head than accumulates on the rear, upstream side of the dam means, pressing the side seals 24 into frictional engagement with the channel sides and similarly pressing the bottom seal 38 against the channel bottom. The bottom contacting member 40 is pressed against the channel bottom with increasing pressure as the water head builds. The force of the water head causes the dam to move downstream as the current of water passing through water passageway 34, 36 flushes loose wastes in the downstream direction. At the same time, the brush 46 or wiper 42 loosens and stirs wastes in front of the dam means for improved cleaning by the flushing action of the water stream when the dam means reaches the area formerly scrubbed by the bottom contacting member. The cleaning device 10 will stop when the forwardmost portion strikes the downstream screen 18. At this time, the wastes will be partially washed away by the downstream current and partially accumulated in front of the dam means and behind the bottom contacting member. The cleaning devices may then be lifted from the water channel, releasing the retained head of water to further carry the wastes downstream, or the concentrated wastes may be removed by a suction device. Fish in the raceway may be concentrated in the same area as the wastes, and for this reason it may be desirable to lift the cleaning device out of the raceway and permit the fish to swim upstream. Fish may be released in this manner at upstream points along the raceway also, with no loss of cleaning efficiency, since the wastes are incapable of movement against the current.

As described, the cleaning device is capable of water propelled movement with either water flushing action alone or additional frictional rubbing or scrubbing action by a bottom contacting member. Accordingly, the scope of the invention is not to be limited by the above description, which is provided by way of example only.

I claim:

1. A cleaning device for elongated water channels having a bottom and a pair of opposite side walls, comprising:
   (a) dam means for, in use, retaining a head of water flowing through said channel therebehind to propel the device;
   (b) support means attached to said dam means for maintaining the dam means in water-head retaining position while permitting the movement of the dam means along the elongated channel; and
   (c) wherein the dam means defines a water passageway substantially along the bottom edge thereof, said water passageway being in communication with the rear face of the dam means for, in use, receiving water under the pressure of the retained water head and discharging the water forwardly of the dam means and against the channel bottom.

2. The cleaning device of claim 1, wherein said support means comprises an elongated member extending forwardly of the dam means for, in use, supporting the dam means against a surface of the water channel.

3. The cleaning device of claim 1, wherein said support means comprises a channel-bottom contacting member.

4. The cleaning device of claim 1, further comprising a channel-bottom contacting means carried forwardly of said dam means for disrupting removable materials on the channel bottom in advance of the dam means.

5. The cleaning device of claim 1, further comprising a channel-bottom contacting means carried by said support means forwardly of the dam means for disrupting movable materials on the channel bottom in advance of the dam means.

6. The cleaning device of claim 1, further comprising spacer means maintaining said dam means at a predetermined distance from the channel bottom.

7. The cleaning device of claim 1, further comprising a brush oriented substantially transversely to the direction of dam means movement and carried on the forward side of the dam means for loosening movable materials on the channel bottom in advance of the dam means.

8. The cleaning device of claim 1, further comprising a flexible wiper carried forwardly of the dam means and substantially transversely thereto for contact with the channel bottom for disrupting movable materials in advance of the dam means.

9. The cleaning device of claim 1, further comprising bottom seal means connected to said dam means for limiting water passage between the bottom seal means and the channel bottom, wherein said water passageway is defined between the dam means and the bottom seal means.

10. The cleaning device of claim 9, wherein said water passageway comprises a substantially vertical slot defined between said bottom seal means and dam means.

11. A cleaning device for elongated water channels having a bottom and a pair of opposite side walls, comprising:
   (a) a dam member adapted to retain a head of water on its upstream side when, in use, placed across a water channel;
   (b) spacer means connected to said dam member for defining in combination therewith a water passageway near the bottom of said dam member for passing water to flush debris downstream of the dam member;
   (c) means connected to said dam member for frictionally contacting the channel bottom forwardly of the water passageway for disrupting removable material on the channel bottom; and
   (d) means adapted to contact the channel, in use, with limited friction for allowing the dam member to move longitudinally under force of a retained water head while limiting loss of the water head.

* * * * *